United States Patent [19]

Weiler et al.

[11] 4,176,153

[45] Nov. 27, 1979

[54] UNITARY, HERMETICALLY-SEALED BUT PIERCEABLE DISPENSING CONTAINER

[75] Inventors: Gerhard H. Weiler, South Barrington; Dieter H. Nagel, Des Plaines; Louis T. Pagels, Hanover Park, all of Ill.

[73] Assignee: Automatic Liquid Packaging, Inc., Arlington Heights, Ill.

[21] Appl. No.: 876,730

[22] Filed: Feb. 10, 1978

[51] Int. Cl.² ............................................. B29C 17/07
[52] U.S. Cl. ................................. 264/524; 264/534; 425/522; 425/524; 425/525
[58] Field of Search ............... 425/524, 522, 525, 529; 264/96, 98

[56] References Cited

U.S. PATENT DOCUMENTS

| 3,137,748 | 6/1964 | Makowski | 264/97 |
|---|---|---|---|
| 3,288,898 | 11/1966 | West | 264/98 |
| 3,597,793 | 8/1971 | Weiler et al. | 425/524 |
| 3,674,405 | 7/1972 | Hansen | 425/524 |
| 3,919,374 | 11/1975 | Komendowski | 264/98 |
| 3,949,033 | 4/1976 | Uhlig | 425/529 |

Primary Examiner—Roy Lake
Assistant Examiner—John McQuade
Attorney, Agent, or Firm—Dressler, Goldsmith, Clement, Gordon & Shore, Ltd.

[57] ABSTRACT

A unitary, hermetically sealed but pierceable dispensing container, suitable for packaging parenteral solutions, is made from a flexible, generally tubular body of thermoplastic material utilizing a form, fill and seal technique and a movable, composite mandrel that includes a forming ram member for compression molding from within the container a container wall portion which includes a pierceable membrane. The tubular body is closed at one end and terminates at the other end in a draining region having an access aperture or port sealed by a unitary membrane of predetermined thickness. The membrane permits penetration of a cannula therethrough without coring, and an annular sealing means surrounding the aperture is adapted for frictional and sealing engagement of the cannula after the membrane has been penetrated.

6 Claims, 11 Drawing Figures

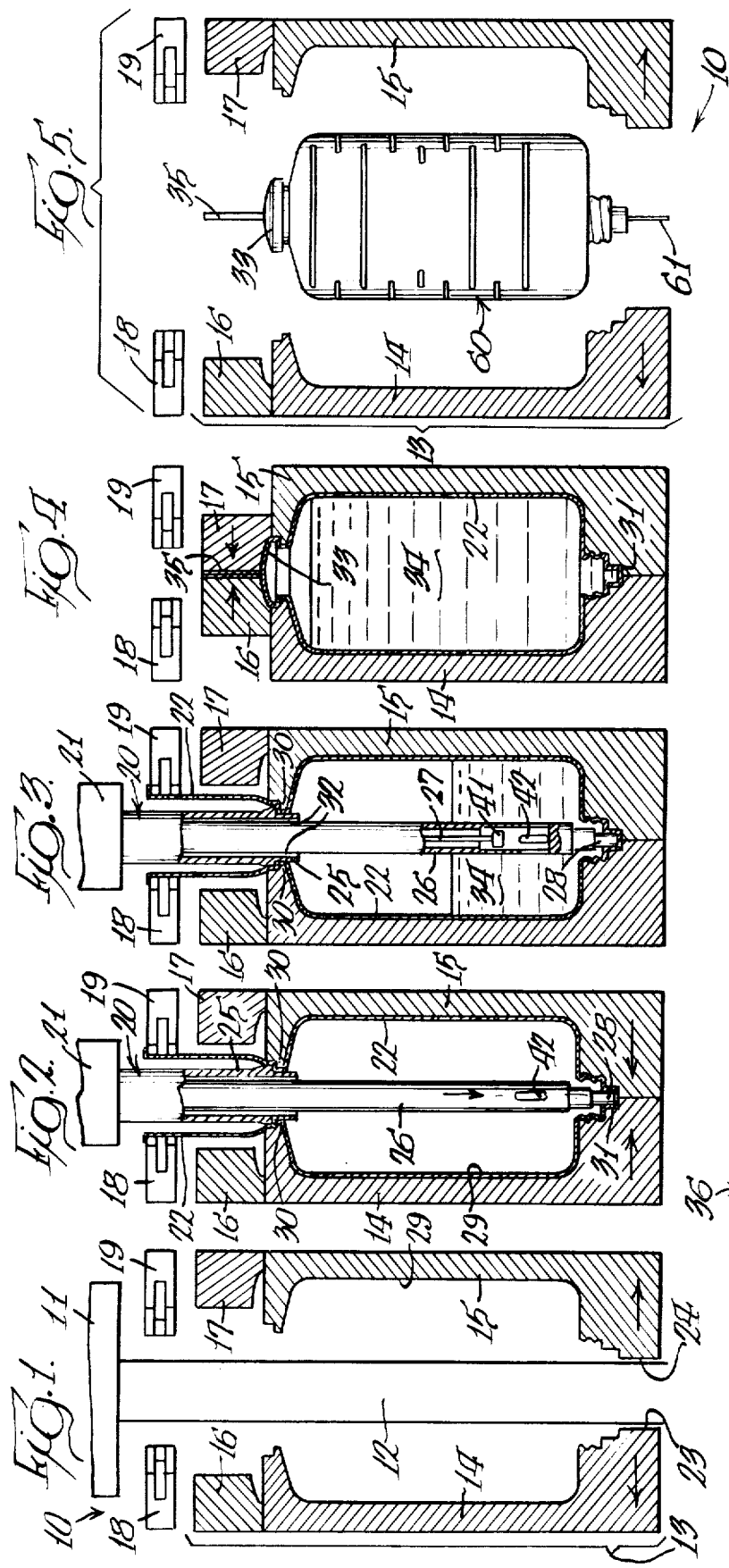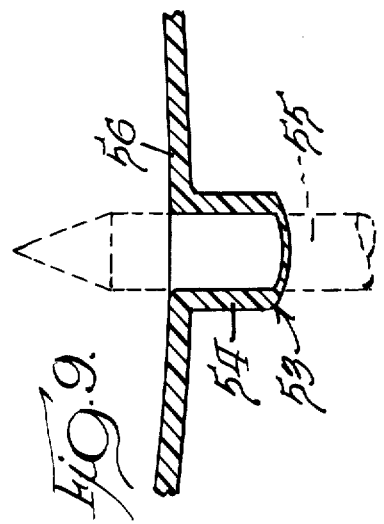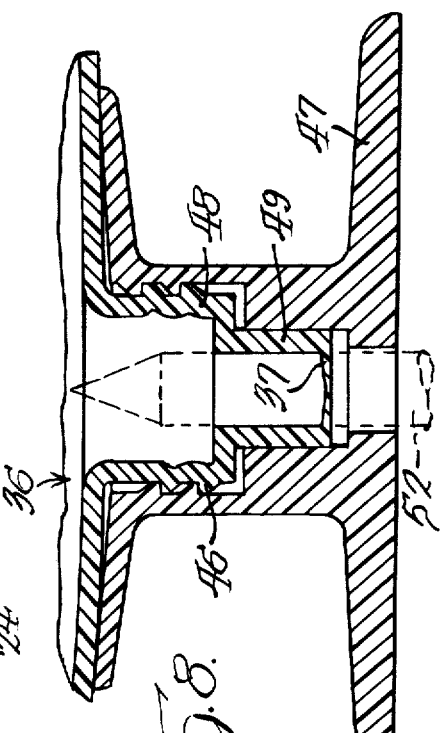

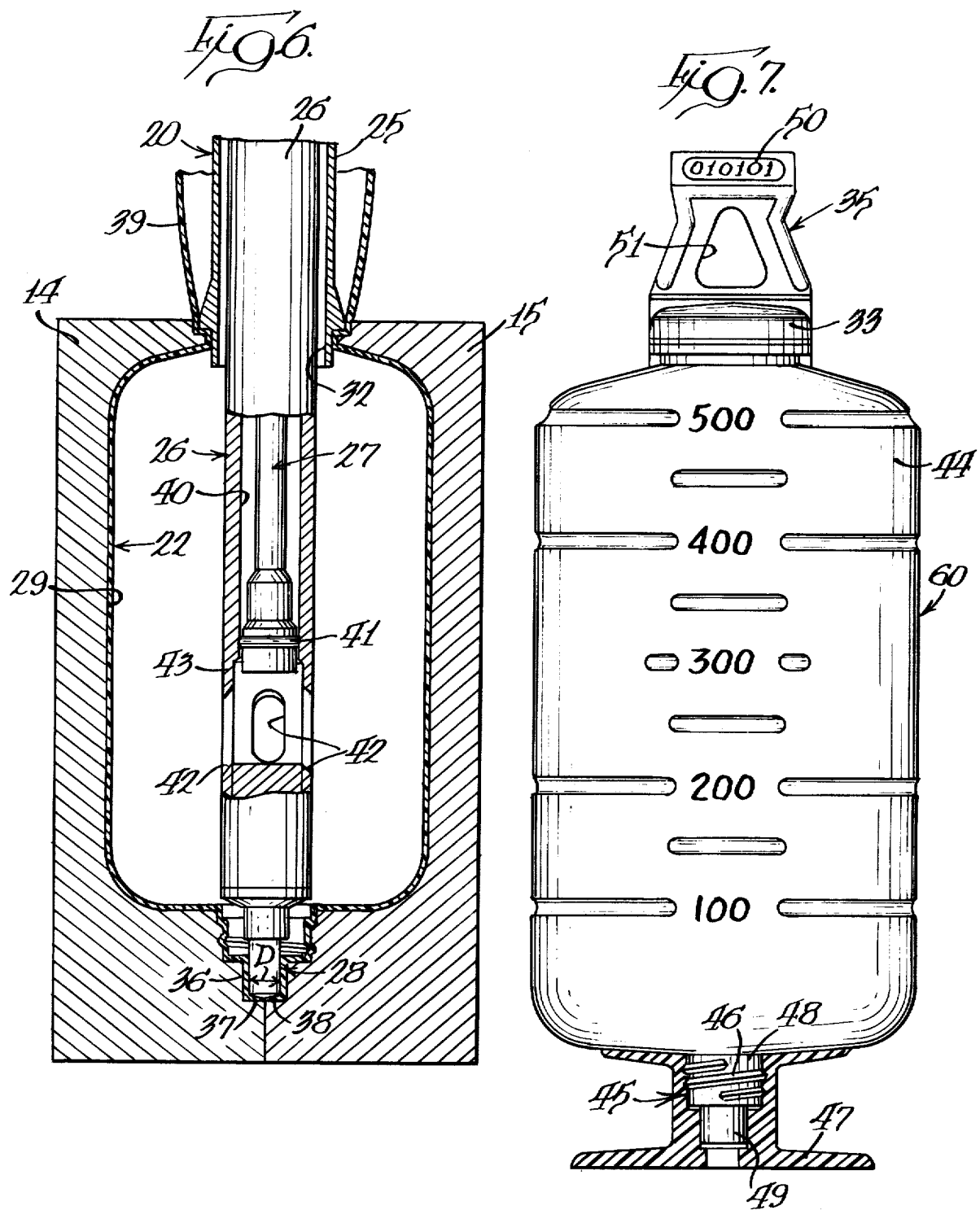

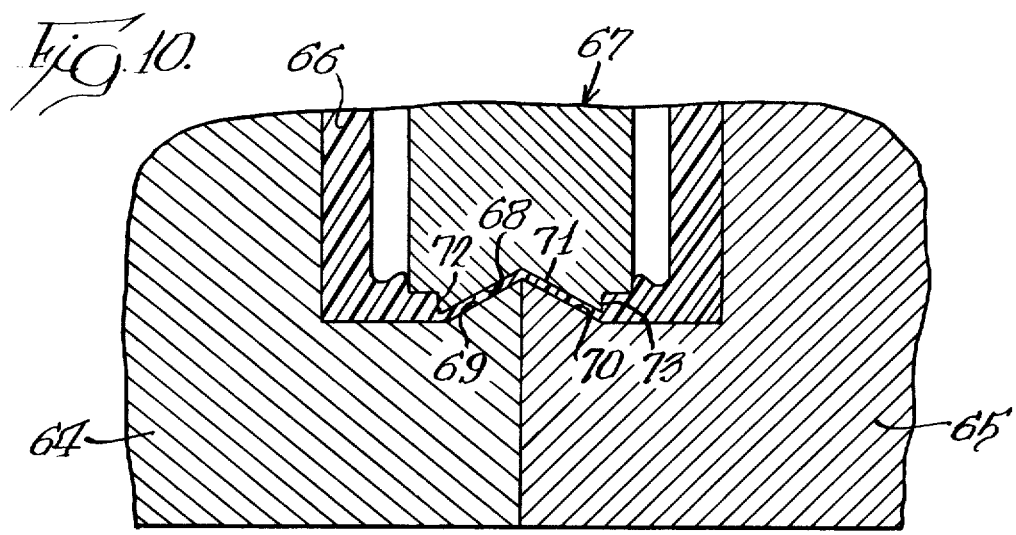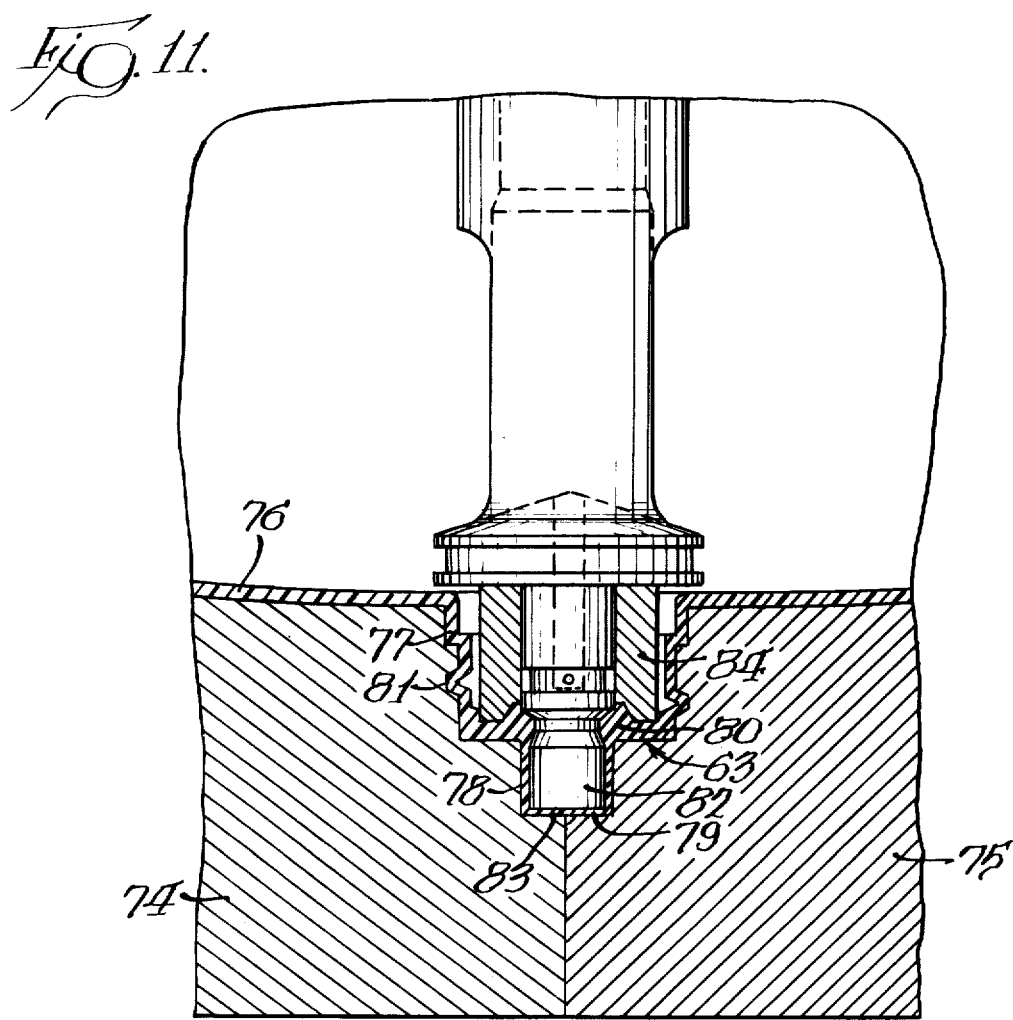

UNITARY, HERMETICALLY-SEALED BUT PIERCEABLE DISPENSING CONTAINER

BACKGROUND OF THE INVENTION

This invention is directed to a method and apparatus for the fabrication of unitary dispensing containers.

Packaging systems that blow-mold, fill and seal containers such as bottles, bags, and the like, enjoy widespread commercial acceptance because of ease of operation and reduced labor cost. Moreover, such a packaging system obviates the need for costly auxiliary equipment that cleans and handles empty containers, fills the containers, and subsequently seals the filled containers. A packaging system of the foregoing type is disclosed in U.S. Pat. No. Re. 27,155 to Hansen.

Since the complete filling cycle for a container takes place in an enclosed environment when the aforementioned form, fill and seal packaging system is employed, this system is well-suited for sterile and aseptic packaging of parenteral solutions and the like substances. However, for such solutions it is desirable to provide a container having a pierceable wall portion of controlled dimensions that can be penetrated by and receive a cannula without undesirable coring and leaking when it is desired to drain the container contents.

Heretofore, it has not been possible to consistently attain the requisite dimensional control in a unitary blow-molded container. Thus, prior art containers of this general type include in the region intended for cannulation one or more auxiliary components that are incorporated into the blow-molded container during fabrication or are added on subsequently. Illustrative prior art containers are shown in U.S. Pat. No. 3,919,374 to Komendowski, U.S. Pat. No. 3,746,001 to Ralston, Jr., and U.S. Pat. No. 3,589,422 to Bellamy, Jr. The present invention, on the other hand, provides a method and apparatus for making a unitary dispensing container that is readily pierceable for draining, that requires no auxiliary members for retaining a cannula in a sealing relationship with the pierced container, and that has no undesirable recesses capable of trapping extraneous matter and thereby causing sterility problems.

SUMMARY OF THE INVENTION

A unitary, hermetically-sealed but pierceable dispensing container is eminently suitable for containing parenteral solutions. The dispensing container comprises a flexible, generally tubular body of thermoplastic material, closed at one end and terminating at the other end in a draining region provided with an annular sealing means unitary with the tubular body and defining an access aperture or port that is hermetically occluded by a pierceable membrane unitary with the sealing means. The membrane is sufficiently thin to permit penetration by a cannula without coring, and the annular sealing means is adapted to receive the cannula in a sealing frictional engagement when the membrane has been penetrated. The draining region can also be provided with a draining protuberance having a hollow, generally cylindrical portion or bore of substantially uniform inside diameter that guides the entry of the cannula and operates as the annular sealing means, i.e., the inside diameter of the aforesaid generally cylindrical portion or bore is adapted to frictionally engage the cannula in a sealing relationship after the membrane has been penetrated.

Dispensing containers of the foregoing type can be conveniently fabricated by means of modified blow-molding techniques utilizing an apparatus comprising at least one relatively movable sectional mold assembly adapted to enclose a portion of an extruded, hollow, thermoplastic tube that is still in a plastic state, a holding jaw means associated with the mold assembly, and a movable, composite mandrel which includes a blowing nozzle, a filling nozzle, and a forming ram member.

The sectional mold assembly includes lower sectional mold parts that are adapted to shape a main body portion of the container and upper sectional mold parts that are adapted to shape and seal a top portion of the container. The upper sectional mold parts are movable independently of the lower sectional mold parts.

The holding jaw means are adapted to engage the length of the thermoplastic tube when a major portion of this length is enclosed by the lower sectional mold parts so as to support the length of the thermoplastic tube out of contact with the upper sectional mold parts while the main body portion of the container is formed. The holding jaw means preferably utilize vacuum to retain the length of thermoplastic tube in the desired position.

The movable, composite mandrel is supported above the length of the thermoplastic tube when the latter is enclosed by the sectional mold assembly and is adapted to be introduced into an open end of the hollow tube. Th blowing nozzle of the mandrel is adapted for supplying a fluid, i.e., air or liquid, under pressure so as to expand the major portion of the tube into contact with the lower sectional mold parts and thereby shape the main body portion of the container. The filling nozzle introduces the desired material into the container. The forming ram member is adapted to compression mold, from within the shaped main body of the container, a wall portion thereof to a predetermined configuration and dimension so as to provide a draining region having the annular sealing means and a pierceable membrane unitary therewith.

BRIEF DESCRIPTION OF THE DRAWINGS

In the drawings,

FIGS. 1 through 5 are elevational views, partly in section, showing the apparatus of the present invention and illustrating the present method of forming, filling and sealing the dispensing containers of the present invention;

FIG. 6 is an enlarged elevational view, partly in section and having portions of the present apparatus broken away to show interior detail;

FIG. 7 is an elevational view, partly in section, showing a dispensing container embodying the present invention and equipped with a pedestal stand;

FIG. 8 is an enlarged fragmentary sectional view of the bottom portion of the present dispensing container supported on a pedestal stand and having a pierceable membrane penetrated by a draining spike which is depicted in phantom;

FIG. 9 is an enlarged fragmentary sectional view showing the bottom portion of another disposing container embodying the present invention, the bottom portion being provided with a pierceable membrane which is shown penetrated by a draining spike depicted in phantom;

FIG. 10 is an enlarged fragmentary sectional view showing the bottom of yet another dispensing container embodying the present invention as the bottom portion is compression molded from within; and FIG. 11 is an enlarged fragmentary sectional view showing the bottom portion of still another dispensing container of this invention as the bottom portion is compression molded from within.

DESCRIPTION OF PREFERRED EMBODIMENTS

Apparatus 10 suitable for the manufacture of the dispensing containers embodying the present invention is generally illustrated in FIGS. 1 through 5. Apparatus 10 includes extruder head 11 from which is extruded parison 12 in the form of a semi-molten, hollow length of tube made from a thermoplastic material. The extruded length of parison 12 is surrounded by relatively movable sectional mold assembly 13 which, in turn, includes lower sectional mold parts 14 and 15 and upper sectional mold parts 16 and 17, the latter being independently slidably movable relative to lower sectional mold parts 14 and 15. Situated above upper sectional mold parts 16 and 17 are holding jaws 18 and 19 which are adapted to engage parison 12 and to hold semi-molten, hollow tube length 22 (FIG. 2) severed therefrom by a convenient cutter means (not shown), e.g., a wire, blade, or the like means.

A hydraulically actuated mold carriage (not shown) moves and positions mold parts 14, 15, 16 and 17 as well as holding jaws 18 and 19 into the necessary positions for molding, filling and sealing the dispensing container. Additionally, movable mandrel 20 adapted to enter an open upper end of tube length 22 after lower sectional mold parts have closed around tube length 22 and to perform container blowing and filling functions is also provided by apparatus 10. The foregoing elements which are part of apparatus 10 are generally similar to the corresponding elements of the apparatus disclosed in U.S. Pat. No. Re. 27,155 to Hansen, the description of which is incorporated herein by reference to the extent pertinent.

In the apparatus of the present invention, however, mandrel 20 is slidably mounted in mandrel carriage 21 and is further adapted to perform a compression molding function which permits the formation of a container wall portion having predetermined, closely-controlled dimensions. To this end mandrel 20 comprises outer nozzle 25, filling tube 26 within outer nozzle 25, blowing tube 27 positioned inside filling tube 26, and forming ram means 28 carried at the distal end of filling tube 26.

To begin manufacture of the dispensing container, tube length 22 is first extruded as parison 12 (FIG. 1), then grasped by holding jaws 18 and 19 as well as by lower sectional mold parts 14 and 15, and thereafter severed as shown in FIG. 2. The severed tube length is still semi-soft at this stage and the pinching action of mold surfaces 23 and 24 (FIG. 1) effectively closes off the lower end of tube length 22 as lower sectional mold parts are moved together to enclose a portion of tube length 22 within container forming cavity 29. However, the upper end of tube length 22, grasped by jaws 18 and 19, remains open and can receive therewithin mandrel 20 positioned immediately above.

To form and fill the dispensing container, mandrel 20 is moved into the upper end of tube length 22 until outer nozzle 25 thereof pinches a portion of tube length 22 against inwardly extending peripheral flange 30 of mold parts 14 and 15. At substantially the same time filling tube 26, carrying forming ram 28 at the distal end thereof, is extended further into cavity 29 until the forming tip of ram 28 abuts a selected, semi-solid wall region 31 and compressively molds wall region 31 to predetermined dimensions (FIG. 2). Thereafter tube length 22, still a semi-molten or semi-solid state, is inflated by a burst of compressed air, or a similar gas, through blowing tube 27 situated within filling tube 26 and assumes the configuration of container-forming cavity 29 defined by mold parts 14 and 15.

Forming ram 28 is machined to accurate dimensions, and by closely controlling the maximum extension of ram 28 within cavity 29, wall region 31 can be fabricated of any desired membrane thickness which can be as low as 0.001 inch of thinner. Similarly, by selecting appropriate contours for ram 28 and the corresponding complementary regions of mold parts 14 and 15, the configuration and the interior dimensions of the compressively-molded container portion can be readily controlled to heretofore unattainable tolerances.

After the foregoing molding operations are completed the formed container is filled through filling tube 26 with a metered quantity of product 34 which constitutes the intended bottle contents (FIG. 3). At the same time the air or other gas utilized to blow-mold the container is discharged through air discharge duct 32 defined between outer nozzle 25 and filling tube 26. When the container is filled to the desired level, mandrel 20 is retracted from within the formed container and upper sectional mold parts 16 and 17 are moved into position to form and seal container head portion 33 (FIG. 4) which can include integral flat portion 35 for providing a hanging means and/or a convenient surface on which to emboss production lot numbers or other desired information.

Completed container 60 is removed from mold assembly 13 by opening mold parts 14, 15, 16 and 17, and by retracting holding jaws 18 and 19, so that container 60, formed, filled and hermetically sealed, can leave apparatus 10 by gravity via a container drop-out chute or by any other convenient means. Any flash 61 remaining on completed container 60 is removed afterwards in a secondary operation according to conventional deflashing procedures.

The present apparatus and method of forming dispensing containers provide numerous advantages in that the apparatus can be readily maintained in a sterile condition, thus pharmaceutical as well as food products can be readily packaged. Any blow-moldable thermoplastic material compatible with the product to be packaged can be utilized. Typical illustrative thermoplastic materials suitable for the present purposes are the usual blow-molding grade materials such as high- and low-density polyethylene, polypropylene, polycarbonate acetate, acrylonitrile-butadiene-styrene (ABS), and the like. Also, by forming and filling dispensing containers in the aforedescribed manner, the filling operation does not impose any undue strength, and thus thickness, requirements on the dispensing container wall. Thus the dispensing container walls can be made relatively thin and flexible.

Compression molding of a wall portion of the container body portion formed within cavity 29, i.e., in the main body portion, to provide a region having an access port or aperture for withdrawing or draining the container contents, is illustrated on a larger scale in FIG. 6. However, before the overall configuration of the dispensing container has been formed by expanding the semi-soft thermoplastic tube length against the contours of cavity 29 as set forth hereinabove, forming ram 28 at the distal end of mandrel 20 and carried at the tip of blowing tube 27 is caused to enter molding cavity 36, which is part of cavity 29, and to displace any excess thermoplastic material that may be present. Inside dimension D of the produced bore closely approximates the corresponding outside dimension of forming ram 28. In instances where forming ram 28 is substantially cylindrical, inside dimension D will be substantially equal to the outside diameter of ram 28. The thickness of pierceable membrane 37 is determined by how deeply ram 28 enters cavity 36 and is controlled by providing an appropriate stop means for controlling, preferably adjustably, the length of the downward stroke for ram 28. In a dispensing container for parenteral solutions, the preferred membrane thickness is about 0.005 inch; however, by utilizing the present apparatus and practicing the present invention, membrane thicknesses as low as 0.001 inch, and thinner can be achieved.

As further shown in FIG. 6, the forming tip end surface 38 of ram 28 can be convex and of substantially conical configuration. In such an instance the produced pierceable membrane can be made having a radially variable thickness and can be made thinnest at the center thereof so as to facilitate penetration by a spike or cannula. If desired, end surface 38 can be made convex and substantially spherical to produce a convex membrane of substantially uniform thickness of the type illustrated in FIG. 9, or end surface 38 can be flat to produce a generally flat membrane of substantially uniform thickness.

In a yet another embodiment of this invention, illustrated in FIG. 10, the forming tip end surface 68 of ram 67 is concave and of substantially conical configuration. In this particular instance lower sectional mold parts 64 and 65 are provided with mold surfaces 69 and 70 that are complementary to end surface 68 and that coact during compression molding with forming tip end surface 68 to produce a concave, substantially conical pierceable membrane 71 unitary with the blow-molded container 66. Membrane 71 occludes or seals access aperture 72 defined by peripheral shoulder 73 that is molded into container 66 by ram 67 at the same time. Peripheral shoulder 73 acts as an abutment for fragments of membrane 71 when membrane 71 is penetrated by a cannula and also serves as an annular sealing means providing a liquid tight seal between a cannula situated within aperture 72 and container 66 as the contents thereof is withdrawn or drained.

A further embodiment of the present invention is illustrated in FIG. 11. Blow-molded container 76 in the draining region thereof is provided with draining protuberance 63 that includes neck portion 77 terminating in a depending end portion 78 unitary with neck portion 77 and container 76. A hollow, generally cylindrical central section or bore of end portion 78 defines a passageway adapted to receive a cannula or draining spike. Substantially flat, pierceable membrane 79 seals or occludes the passageway within end portion 78 and thus the access to the container. Annular bead 80 is provided at the juncture of end portion 78 and neck portion 77 and serves as an annular sealing means for a cannula that penetrates membrane 79 and is guided into container 76 along the passageway provided in end portion 78. Depending on the relative dimensions of the passageway and the cannula, the hollow central section of end portion 78 can also operate as an annular sealing means. If desired, threads 81 can be molded into neck portion 77 during the blow-molding operation, e.g., for receiving a threaded retainer for the cannula.

To compression mold the desired membrane configuration and to provide an annular sealing means around the cannula-receiving aperture or port provided by the passageway in end portion 78, forming tip 82 is provided with a substantially flat end surface 83 and with an annular sleeve member 84 that is press-fit over the forming tip to provide the desired contour for annular bead 80.

The necessary mold cavities for neck portion 77, with or without threads 81, and for end portion 78 can be machined in lower sectional mold parts 74 and 75, or these cavities can be machined separately in appropriate mold inserts that are then incorporated into these lower sectional mold parts.

To set the configuration of the formed dispensing container, the container has to be chilled to a temperature below the softening temperature of the thermoplastic material. If the intended product for the formed container is a liquid of adequate heat capacity, sufficient chilling usually obtains by introducing the product into the formed container at a relatively low temperature. Alternatively, or in cases where the intended product is a powder, mold parts 14 and 15 can be independently chilled by circulating a cooling fluid therethrough. To fill the formed container, the product to be filled is dispensed through annular channel 40, defined between the inner wall surface of filling tube 26 and the outer wall surface of blowing tube 27, past enlarged head portion 41 of blowing tube 27 which acts as a slidable valving means for channel 40, and out through elongated apertures 42. To facilitate filling, the inside diameter of end portion 43 of filling tube 26 is enlarged. The relative positions of filling tube 26 and head portion 41 of blowing tube 27 during filling are shown in FIG. 3. After the filling operation is completed, the entire composite mandrel 20 is withdrawn as set forth hereinabove.

Care must be taken, however, not to chill upper portion 39 of tube length 22 inasmuch as portion 39 must remain in semi-solid state until the formed container is sealed as discussed hereinabove in connection with FIG. 4.

The filled and hermetically sealed container formed in the foregoing manner is illustrated in FIG. 7. Formed container 60 is flexible, is of unitary construction, and is suitable for containing parenteral solutions. Flexible, generally tubular body 44 is closed at one end by container head portion 33 and at the other end terminates in a draining region that includes draining protuberance 45. If desired, draining protuberance 45 can be provided with integrally molded external threads 46 adapted for threadingly engaging pedestal stand 47 of a securing cap for a draining cannula, for receiving a screw-on draining spike, or for similar purposes. Usually draining protuberance 45 has thicker walls than tubular body 44 and thus is less flexible.

Draining protuberance 45 shown in FIG. 7 further includes neck or base portion 48 carrying external threads 46 and a generally cylindrical end portion 49 of substantially uniform inside diameter which is hermetically sealed at the distal end of end portion 49 by unitary, pierceable membrane 37 of predetermined thickness which is selected so as to permit the penetration of a draining cannula or spike 52 without coring as shown on an enlarged scale in FIG. 8. In addition, the inside diameter or bore of generally cylindrical portion 49 is adapted for frictional engagement of the draining cannula or spike after penetration of the membrane, and can also be utilized as an annular seal for the cannula received therewithin. The longitudinal dimension of cylindrical portion 49 can be selected as required for proper retention of the draining cannula.

Flat portion 35, unitary with container head portion 33, is shaped as a coding tab bearing appropriate lot number or other identification means 50 embossed thereon. Central aperture 51 of appropriate configuration to serve as a hanger means for dispensing container 60 can also be provided with flat portion 35.

An alternate configuration of a draining protuberance suitable for dispensing containers of the present invention is shown in FIG. 9. Draining protuberance 53 comprises cylindrical portion 54 of substantially uniform inside diameter or bore and is adapted to receive and retain draining cannula 55 in a sealing relationship. At one end cylindrical portion 54 merges directly into dispensing container bottom wall 56 and the bore of portion 54 is hermetically sealed at the other end by unitary, pierceable membrane 57 of substantially uniform thickness. In the embodiment shown in FIG. 9, membrane 57 has a convex, substantially spherical configuration; however, any other configuration such as flat, conical, or the like, can be formed as discussed hereinabove.

The foregoing specification and the drawings are intended as illustrative and are not to be taken as limiting. Still other variations and rearrangements of parts within the spirit and scope of the present invention are possible and will readily present themselves to one skilled in the art.

We claim:

1. Apparatus for molding, filling and sealing a container from a semi-molten, hollow tube of thermoplastic material having an open upper end which comprises
   at least one relatively movable sectional mold assembly adapted to enclose a length of said tube of thermoplastic material, said sectional mold assembly comprising lower sectional mold parts adapted to shape a main body portion of said container and upper sectional mold parts adapted to shape and seal a top portion of said container;
   holding jaw means associated wih said mold assembly for engaging said length of said tube when a major portion of said length is enclosed by the lower sectional mold parts so as to support the length of said tube during shaping of said main body portion of said container out of contact with said upper sectional mold parts; and
   a movable composite mandrel supported above the enclosed length of said tube and adapted to be introduced into said open upper end of said hollow tube, said mandrel including a blowing nozzle for supplying a fluid under pressure to expand said major portion of said tube into contact with said lower sectional mold parts and thereby shape said main body portion, a filling nozzle, and a forming ram member adapted to compression mold from within the shaped main body portion a wall portion of said main body portion to a predetermined configuration and dimension.

2. The apparatus in accordance with claim 1 wherein said forming ram member is provided with a forming tip of predetermined dimensions and configuration at the distal end of said mandrel.

3. The apparatus in accordance with claim 2 wherein said forming tip has a convex, substantially conical end surface.

4. The apparatus in accordance with claim 2 wherein said forming tip has a convex, substantially spherical end surface.

5. The apparatus in accordance with claim 2 wherein said forming tip has a concave, substantially conical end surface.

6. A method of forming, filling and hermetically sealing a pierceable container having a desired content which comprises the steps of
   providing an open assembly of sectional mold parts defining a container-forming mold cavity therein when closed;
   extruding a parison in the form of a semi-solid, elongated hollow tube between said mold parts;
   severing a predetermined tube length from the parison to provide an access opening into the severed tube length for receiving a composite mandrel which includes a blowing and filling nozzle and a forming ram member;
   closing said assembly about said severed predetermined tube length so as to confine a portion of the tube length between the mold parts and within said container-forming cavity while closing one end of the confined tube length and permitting the access opening to remain open at the other end of the tube length;
   positioning said composite mandrel so as to close the access opening blade and blow-forming said tube length so as to provide semi-solid walls defining said container;
   forming a pierceable wall region of predetermined dimensions in said container by urging said forming ram member against a selected semi-solid wall region of the blow-formed container so as to compressively mold from within the blow-formed container a wall region of predetermined dimensions;
   filling the blow-formed container with the desired contents through said composite mandrel;
   retracting said forming ram member from said selected wall region;
   providing forming and sealing means for closing the open end of said confined tube length so as to hermetically seal the filled container;
   operating said forming and sealing means to hermetically seal the filled container; and
   opening said assembly to remove the filled and hermetically-sealed but pierceable container.

* * * * *